United States Patent Office 2,962,129
Patented Nov. 29, 1960

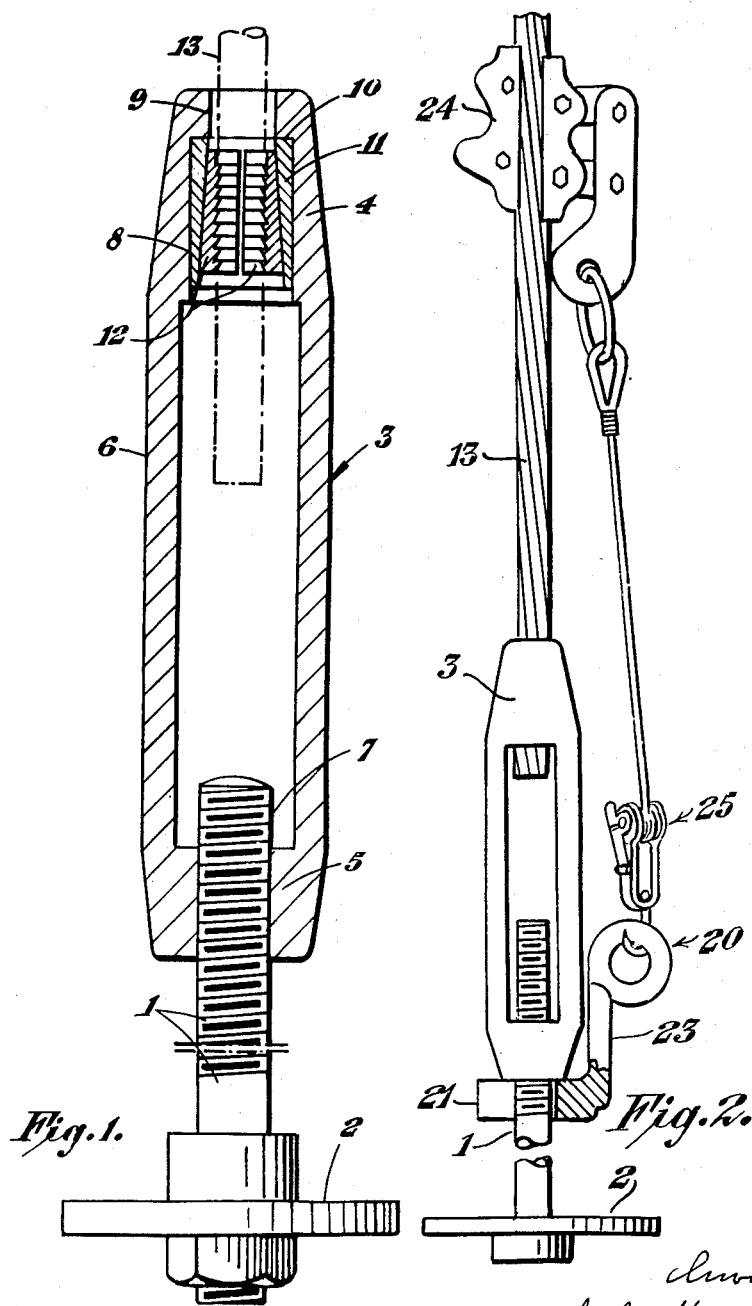

2,962,129
STAY RODS

John Howard Walton, Church Grove, Hampton Wick, England, assignor to Cable Covers Limited, London, England, a company of Great Britain Filed June 24, 1957, Ser. No. 667,341

4 Claims. (Cl. 189—31.5)

This invention relates to stay rods of the kind commonly used in polestaying such as for anchoring the stay wires of telegraph poles in the ground.

It is customary, when securing a telegraph pole in the ground, to connect the stay wires to stay rods in which the end portions of the wires are held by gripping members, and thereafter to bring the wire to the required tension by means of a tensioning device.

From time to time after installation of the stay rod in the ground it becomes necessary to re-tension a wire which has slackened somewhat due to movement of the soil in which the rod is fixed.

It is the object of this invention to provide a stay rod of a design which makes possible simple adjustment of the tension of the stay wire subsequent to installation.

According to the present invention a stay rod comprises an anchor rod adapted to be secured in the ground and a frame member threadedly connected to the anchor rod for telescopic axial movement relative to the rod upon turning movement of the frame and a sleeve mounting internally thereof gripping means for a stay wire, said sleeve being carried in the frame so as to permit the frame to be turned without turning the sleeve and therefore without twisting the wire.

Conveniently, the sleeve is of simple cylindrical form. The gripping means are preferably constituted by tapered jaw members presenting serrated gripping surfaces to the wire which allow the wire to move freely in one direction to further tension it but prevent it moving in the reverse direction.

The invention is illustrated in the accompanying drawings, of which Figure 1 is a vertical sectional view of the device, and Figure 2 is a diagrammatic view showing the use of tensioning means in connection therewith.

An anchor rod 1 is provided, connected at its lower end to a base plate 2 which provides the means of securing the device in the ground. The upper end of the rod 1 is threaded for part of its length and supports in threaded engagement therewith a frame member 3. The frame member 3 is a drop forging of mild steel comprising upper and lower end parts 4, 5 connected by a pair of side pieces 6 so as to provide a central opening. The lower part 5 is bored and threaded right through so that the threaded part 7 of the anchor rod 1 moves into or out of the frame 3 upon turning movement of the latter. To do this it is sufficient to insert a tommy bar in the opening and rotate the frame member in the manner of a turnbuckle. In the upper end 4 of the frame is a bore 9 for the stay wire, the bore 9 on the inside having a counter bore 8 to provide a recess in which is accommodated a sleeve element 11. Sleeve 11 abuts at one end against a shoulder 10 formed between bore 9 and counter bore 8. Sleeve 11 has a cylindrical outer surface and is capable of axial rotation in the counter bore 8, a layer of graphite or other lubricant between the mating surfaces of the sleeve and bore facilitating the rotation. The inner surface of sleeve 11 tapers towards the bore 9 and supports gripping members or jaw elements 12 known as "carrots" inside the sleeve. The inwardly facing gripping surfaces of members 12 are serrated to improve their effectiveness in gripping the outer surface of the stay wire. To use the stay rod of the invention as illustrated in Figure 2, a length of stay wire 13 is threaded through the bore 9 and passed between the carrots 12 into the space between the side pieces 6 of the frame member.

To tension the wire, a straining tool 20 comprising a slotted abutment end 21 integrally connected to an eye 22 by an arm 23 is positioned as shown so as to lock against the bottom of the frame member 3, and is then linked to a gripping device known as a "come-along tong" indicated at 24 which grips the wire 13 at a point further up. The linking device, indicated at 25 consists of conventional mechanism including, for example, a tension ratchet or pull-lift.

The wire 13 is pulled up tight through the sleeve and gripping jaws 5 by the operation of the tensioning system, after which the wire is cut to leave a convenient length protruding from the lower end of the gripping means. The tensioning system is then removed. The serrated faces of the carrots 12 then hold the wire fast against movement under the action of the load on the wire.

To adjust the device subsequently, should slackening of the wire have occurred e.g. due to soil movement, a tommy bar is inserted between the side pieces 6 and the frame 3 is turned until the wire is correctly tensioned. The provision of the sleeve 11 thus permits the frame to turn about the sleeve 11 which is locked against movement by the pull of the wire 13 on the carrots 12.

What is claimed is:

1. A stay rod connector comprising a frame member having a threaded opening at one end for receiving a threaded anchor rod for axial movement relative thereto upon turning the frame member, and a hole in its other end for receiving a stay wire; a sleeve element mounted within and for rotation relative to the frame member in a position adjacent the stay wire hole; a shoulder on said frame member concentric with said hole and in abutting engagement with said sleeve for preventing movement of said sleeve outwardly through said other end of the frame member; and gripping elements fitting within the sleeve element with the outer surfaces of said gripping elements in contact with the inner surface of said sleeve element and the inner surfaces of said gripping elements facing inwardly for gripping the outer surface of the stay wire to be received in said hole and extending between said gripping elements, said frame member being rotatable relative to said anchor rod and said sleeve without turning said sleeve and therefore without twisting the wire.

2. A stay rod connector comprising a frame member having a threaded opening at one end for receiving a threaded anchor rod for axial movement relative thereto upon turning the frame member, and a hole in its other end for receiving a stay wire, said hole having a counterbore; a sleeve element mounted for relative rotation within said counterbore; and gripping elements fitting within said counterbore with the outer surfaces of said gripping elements in contact with the inner surface of said sleeve element and the inner surfaces of said gripping elements facing inwardly for gripping the outer surface of the stay wire to be received in said hole and extending between said gripping elements, the mounting of said sleeve element for relative rotation within said counterbore enabling the frame member to be turned without turning said sleeve member and therefore without twisting the wire.

3. A stay rod connector comprising a frame member having a threaded opening at one end for receiving a threaded anchor rod, a hole at its other end for receiving a stay wire, and a recess connecting with said hole; a sleeve element mounted in said recess for relative rotation therein, said sleeve element having a taper bore; and wedge-form gripping elements fitting within the taper bore of the sleeve element with the outer surfaces of said gripping elements in contact with said taper bore and the inner surfaces of said gripping elements facing inwardly for gripping the stay wire, said frame member being rotatable relative to said anchor rod without turning said sleeve and therefore without twisting the wire.

4. In a stay rod connector, the combination with a frame member having a central recess and provided with an opening at each end thereof communicating with the recess, the opening at one end being threaded for engagement with an anchor rod and the opening at the other end having a counterbore, of a sleeve element fitting within said counterbore and being rotatable therein, said sleeve element having a tapered bore which at its narrow end registers with the opening in said other end of the frame member; and gripping means having tapered outer surfaces fitting the taper bore of the sleeve element, whereby when in use and an anchor rod has been threaded into the threaded opening in said one end of the frame member and the stay wire drawn through the opening at said other end and locked in position by the gripping elements, said frame member is capable of rotation about the stay rod to enable the tension to be adjusted without turning the sleeve and therefore without twisting the wire.

References Cited in the file of this patent
UNITED STATES PATENTS

| | | |
|---|---|---|
| 1,880,193 | Blackburn | Oct. 4, 1932 |
| 2,157,227 | Brick et al. | May 9, 1939 |
| 2,180,866 | Cryer | Nov. 21, 1939 |